No. 642,953. Patented Feb. 6, 1900.
H. BLUMENBERG, Jr. & F. C. OVERBURY.
ELECTRIC BATTERY.
(Application filed Mar. 27, 1899.)
(No Model.)
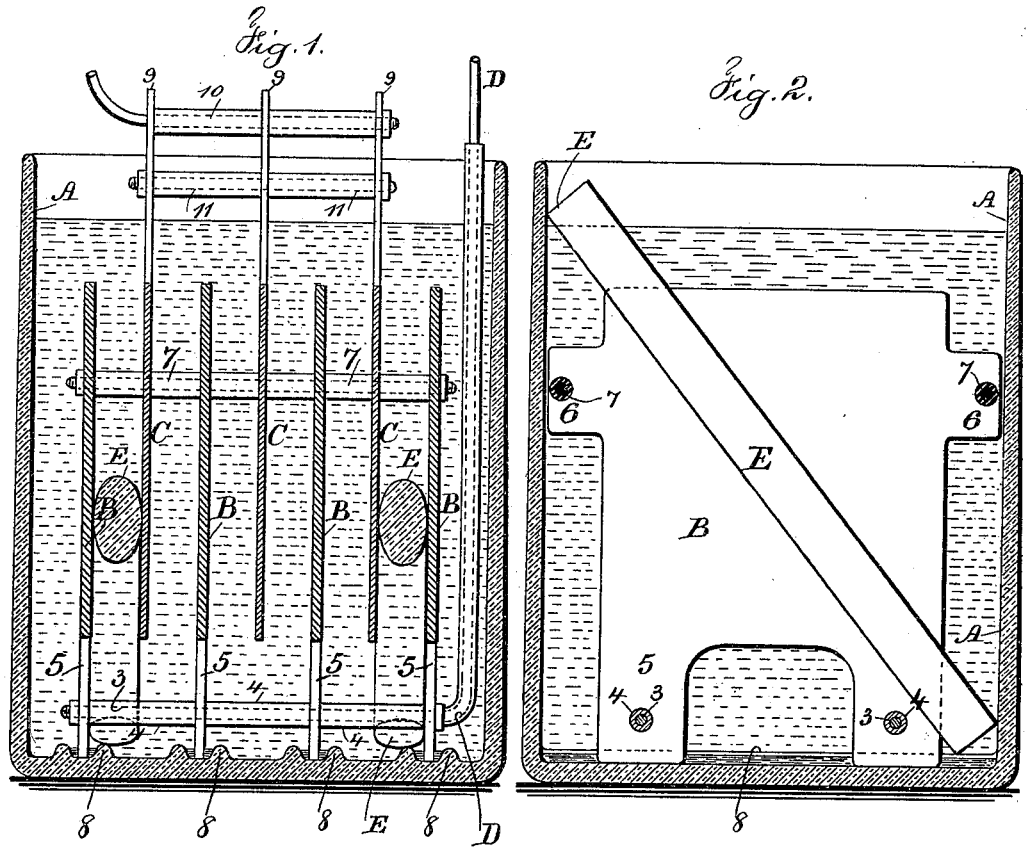
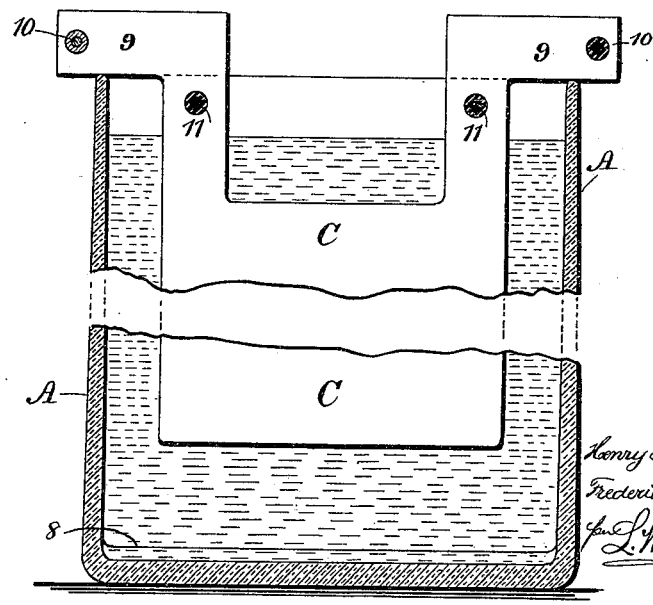

UNITED STATES PATENT OFFICE.

HENRY BLUMENBERG, JR., AND FREDERICK C. OVERBURY, OF NEW YORK, N. Y.

ELECTRIC BATTERY.

SPECIFICATION forming part of Letters Patent No. 642,953, dated February 6, 1900.

Application filed March 27, 1899. Serial No. 710,573. (No model.)

*To all whom it may concern:*

Be it known that we, HENRY BLUMENBERG, Jr., residing at New York, (Wakefield,) in the borough of Bronx, and FREDERICK C. OVERBURY, residing at the city of New York, in the county of New York, State of New York, citizens of the United States, have invented an Improvement in Electric Batteries, of which the following is a specification.

In secondary or storage batteries zinc plates have been placed between lead plates in the cell containing the electrolytic solution; but difficulty has arisen in consequence of the zinc plates being disintegrated and destroyed, and where the oxid or disintegrated zinc falls down in the cell it sometimes comes in contact with the lead plates or the connections of the same and the battery is short-circuited.

The object of the present invention is to prevent injury to the zinc element in the battery as far as possible, to connect these zinc elements in such a way as to prevent the connection being injured by the electrolytic fluid, to suspend the lead plate or other electrode of the battery in such a way that the plates intervene between the zinc electrodes, and the connections between the lead plates are entirely above the electrolytic liquid and where it is impossible for the current to become short-circuited.

In the drawings we have represented in Figure 1 a vertical section of the battery-cell. Fig. 2 is a vertical section at right angles to Fig. 1, showing a plate and the connections for the zinc element; and Fig. 3 is a similar section showing the lead element of the battery and the connections for the same.

The cell A is to be of any desired character and usually quadrangular, and the zinc plates B and lead plates C are to be of any desired number and arranged alternately, as usual in secondary batteries. The zinc plates B are connected together near their lower ends by the metallic connections 3, and these are advantageously made with nuts or washers 4 at opposite sides of the zinc plates, so that the plates can be clamped together and held at the required distances apart. We prefer to make these plates B with downwardly-extending legs 5, that rest upon the bottom of the cell, and we also provide arms 6, extending out from the zinc plates near their upper edges and connected together by rods 7, which may be of vulcanite, glass, or any suitable material that will keep the plates at the proper distances from each other and substantially parallel, and the height of these plates B with reference to the height of the battery-cell is such that the electrolytic liquid can be filled into the cell and rise entirely above the upper edges of these plates B.

The object of the foregoing construction is to prevent as far as possible the destruction of the zinc element, because in practice it is found that the zinc element is the most injuriously affected at the junction of the line of the electrolytic liquid and the atmosphere, and we find that by placing the zinc plates entirely below the surface of the electrolytic liquid all parts of the zinc plates are acted upon with substantial uniformity.

The metallic connections 3 coming at the bottom of the cell are not as liable to destruction as connections that are near the surface of the electrolytic liquid, and in case of disintegration the particles of zinc that may fall to the bottom of the cell are not liable to be suspended or supported in a position where they will accumulate and come in contact with the lead or other plates of the cell, because, as hereinafter specified, the bottoms of these lead plates are at a considerable distance from the bottom of the cell and about on the level with the upper ends of the legs 5 and the lower edges of the plates B.

In electric batteries it is important that the surfaces of the zinc plates should be amalgamated with mercury, and with this object in view a supply of mercury has been provided; but the amalgamation has been unequal and uncertain. We place mercury in the bottom of the cell A and in contact with the legs 5, and it is advantageous to make channels across the bottom of the cell, there being ribs 8, so as to hold the mercury in the channels that contain the lower ends of the legs 5, and we find that where the mercury is thus provided it will by the capillary action or otherwise pass up the legs and over the entire surfaces of the zinc plates, so as to maintain a thorough amalgamation of such surfaces. The amalgam also extends over the metallic connections 3 and lessens the risk of injury to the same, and the conductor D, which extends out from one of the connections 3, passes up to the top of the cell and may have a tube of rubber upon it or be provided with other insulating or protecting material.

The lead plates C are provided with arms 9, which advantageously extend out and rest upon the top edges of the cell A, and these lead plates hang in between the zinc plates B, and their lower edges are at a sufficient height from the bottom of the cell to be out of the way of any zinc that may become detached from the plates and fall to the bottom in order that a short circuit may never be made between such accumulation and the lower plates, and we remark that in secondary batteries the zinc is taken up in solution and deposited upon the zinc plates as the current is passed through the battery in charging the same, so that there is little or no loss of the zinc.

The lead plates C require to be permanently connected together, and with this object in view rods or other connections 10 are passed through the arms 9, near their outer ends, and washers or short tubes may be employed around the rods 10 and between one plate and the next to determine the distances apart of said plates, and we also employ advantageously hard-rubber rods or connections 11 between arms at the tops of the lead plates, so as to render the connections between the plates as firm as possible; but there is nothing upon which disintegrated zinc or other material can lodge as the battery is in operation. Hence the risk of injury or short-circuiting is reduced to a minimum.

It is necessary to keep the sets of lead plates at the proper distances between the sets of zinc plates, and with this object in view any suitable means may be employed; but we find it advantageous to use glass rods E of a size corresponding to the spaces between the respective plates, and these glass rods can be introduced at one or both sides of the respective plates and effectually prevent the lead plates moving in one direction or the other, and thereby lessening the distance between the lead plates and the zinc plates on the one side and increasing that distance on the other side.

We find that battery-plates constructed and connected in the manner before described are very reliable and durable, and the risk of the cell becoming defective or inoperative is prevented.

We claim as our invention—

1. A battery-cell adapted to receive mercury in the bottom, in combination with plates and metallic connections holding the plates parallel and in a group, such metallic connections being near the bottom edges of the plates so as to become amalgamated upon the exposed surfaces, the mercury also passing up upon the surfaces of the plates, substantially as set forth.

2. In a battery-cell, a range of parallel zinc plates having legs at their lower edges, metallic connections passing through the legs and means for holding the plates parallel and equidistant, arms extending out near the upper edge of the plate and connections passing through such arms to support the same and a conductor connected with the metallic connections and extending up to the top of the cell, substantially as set forth.

Signed by us this 24th day of March, 1899.

HENRY BLUMENBERG, JR.
FREDK. C. OVERBURY.

Witnesses:
GEO. T. PINCKNEY,
E. E. POHLÉ.